Figure 1:
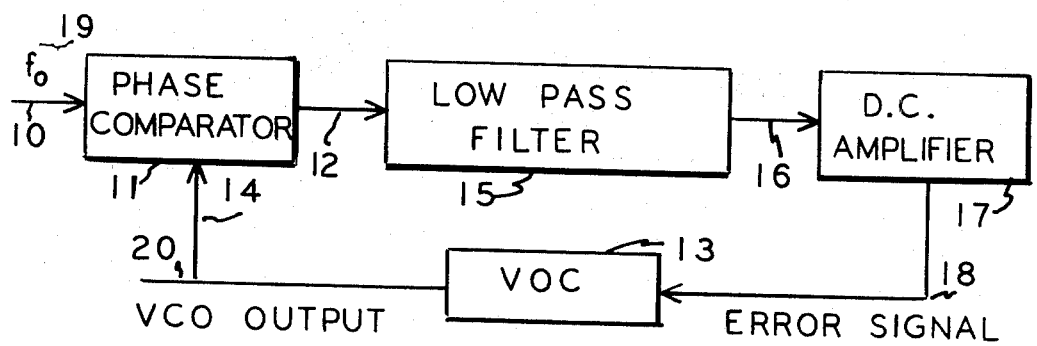

United States Patent
Sternberg et al.

[11] 3,789,354
[45] Jan. 29, 1974

[54] PASSIVE HOLOGRAPHY SYSTEM

[75] Inventors: Ronald Frederick Sternberg; Roger Fred Koppelmann, both of Livonia; Rolf K. Mill, Brighton, all of Mich.

[73] Assignee: The United States of America as represented by the Secretary of the Navy, Washington, D.C.

[22] Filed: Nov. 21, 1972

[21] Appl. No.: 308,387

[52] U.S. Cl. .............................. 340/5 H, 340/16 R
[51] Int. Cl. ........................................... H04b 11/00
[58] Field of Search... 340/5 H, 5 R, 6 R, 16 R, 3 D

[56] References Cited
UNITED STATES PATENTS
3,599,142   8/1971   Rust.................................. 340/5 R

*Primary Examiner*—Richard A. Farley
*Attorney, Agent, or Firm*—R. S. Sciascia; R. J. Miller

[57] ABSTRACT

The disclosure deals with a passive holography system for imaging remotely generated coherent acoustical signal source thru the techniques of phase locking a locally controlled, voltage controlled oscillator to the signal and at the same time displaying those signals so that an acoustical spectrum can be sampled and recorded until a desired signal is identified and then a second phase-locked-loop circuit is controlled to automatically track the received incoming signal and generate a reference signal which is coherent with the received signal and which is used by the holographic system to image the source of the received signal.

6 Claims, 4 Drawing Figures

PASSIVE HOLOGRAPHY SYSTEM

The invention described herein may be manufactured and used by or for the Government of the United States of America for governmental purposes without the payment of any royalties thereon or therefor.

There is an ever increasing demand for improved underwater detection equipment and for means of identifying and isolating specific received signals to observe and identify these sources.

Patent applications have been filed on basic systems for such devices and there is a continuing ongoing need for improvement of such devices. One such problem identified with existing equipment is that there is a limited range in which they can operate and it is necessary to expand the range of such passive equipment, and at the same time upon identification of a signal to be studied, it is still necessary to have extremely sensitive equipment for following these signals accurately.

This disclosure describes a methos by which holographic principles and techniques as described in "An Underwater Viewing System Using Sound Holography" by H. R. Farrah, E. Marom, and R. K. Mueller from Acoustical Holography, Vol. 2 and "Design and Preliminary Test of an Underwater Viewing System Using Sound Holography" by E. Marom, R. K. Mueller, R. F. Koppelman and G. Zilinskas, may be used to image an object which is, itself, a source of radiation (acoustic, microwave, etc.). This is referred to as "passive holography" since no energy source (transmitter) integral to the holographic system is required.

In conventional (acoustic) holographic systems, both an energy source to irradiate the object and a reference source is required. The hologram is made by simultaneously recording the object wave reflected and scattered from the object and the reference wave. The reference wave may be an simulated electronically, but it must be coherent with the source used to irradiate the object. For the passive holography concept described here, the radiation frequency (wavelength) from the object is generally not known beforehand, but it is possible to image the object if the radiation frequency is within the frequency band of the holographic system and if the system has the following capabilities:

1. A means for interrogating the frequency band of interest and identifying the radiation frequency
2. A means for "locking on" the radiated frequency during hologram generation
3. A means for providing a synthetic electronic reference signal coherent with the object signal to be imaged.

It is therefore an object of this invention to provide a passive holography system for receiving remotely generated coherent signals and imaging the source of these signals.

It is a further object of this invention to provide a passive holography system including first, second and third pahse-locked-loop circuits coupled together to receive incoming coherent signals and to generate a series of signals capable of display upon an X-Y recorder to show the frequency spectrum of received signals so that signals of interest may be identified and followed.

Still a further object of this invention is to provide a passive holography system comprising; an input circuit for receiving coherent remotely generated acoustical signals and generating an output signal therefrom; a first phase-locked-loop circuit coupled to receive the output signal from the input circuit; a second phase-locked-loop circuit coupled to receive a signal from the first phase-locked-loop circuit, a third phase-locked-loop circuit coupled to the signal from the second phase-locked-loop circuit for generating an output signal that is a frequency multiple of the acoustical signal; a switching system having manual and automatic positions for providing two modes of operation for the system coupled to the first and second phase-locked-loop circuit; an X-Y recorder coupled to the switching circuit; a gate circuit coupled to the X-Y recorder; the gate circuit coupled to receive the frequency multiplied output signal; means for coupling the output of the first phase-locked-loop circuit to the gate circuit; a multiplier circuit coupled to the output of the second phase-locked-loop circuit and to the input circuit for generating a signal that is a multiple of the output of the second phase-locked-loop circuit; and, a low pass filter coupled to receive the output of the multiplier circuit to provide an amplitude modulated signal coupled to the gate circuit.

It is yet a further object of this invnetion to provide an improved system of the previous paragraph with the addition that the phase-locked-loop circuit includes an input phase comparator circuit, a low pass filter, a direct current amplifier, a voltage controlled oscillator in which the phase comparator receives a signal from the input system and couples it thru the low pass filter to the direct current amplifier that develops an error signal which is utilized to drive the voltage controlled oscillator to change the frequency output of the voltage controlled oscillator in a direction to bring the oscillator to the same frequency as the signal from the input system. The output of the oscillator is coupled to the phase comparator.

Still a further object of this invention is to provide an improved passive holography system of the previous paragraph wherein the second phase-locked-loop circuit is substantially the same configuration of the first phase-locked-loop circuit.

It is still a further object of this invention to provide an improved passive holography system of the previous paragraph wherein the low pass filter circuit provides a memory unit for maintaining the locally controlled voltage controlled oscillator at the last received frequency should the incoming coherent acoustical signal be temporarily lost.

Figure 2:
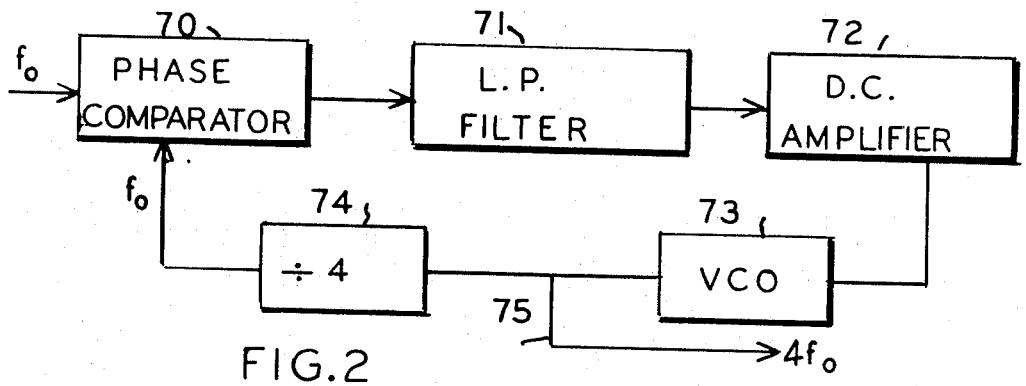
Figure 3:
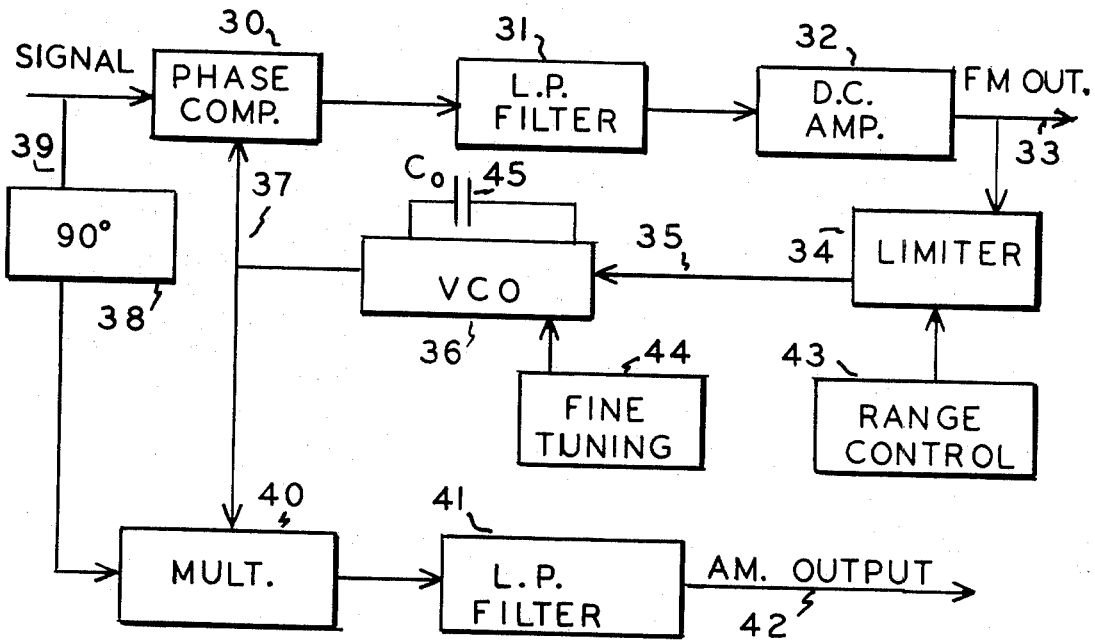
Figure 4:
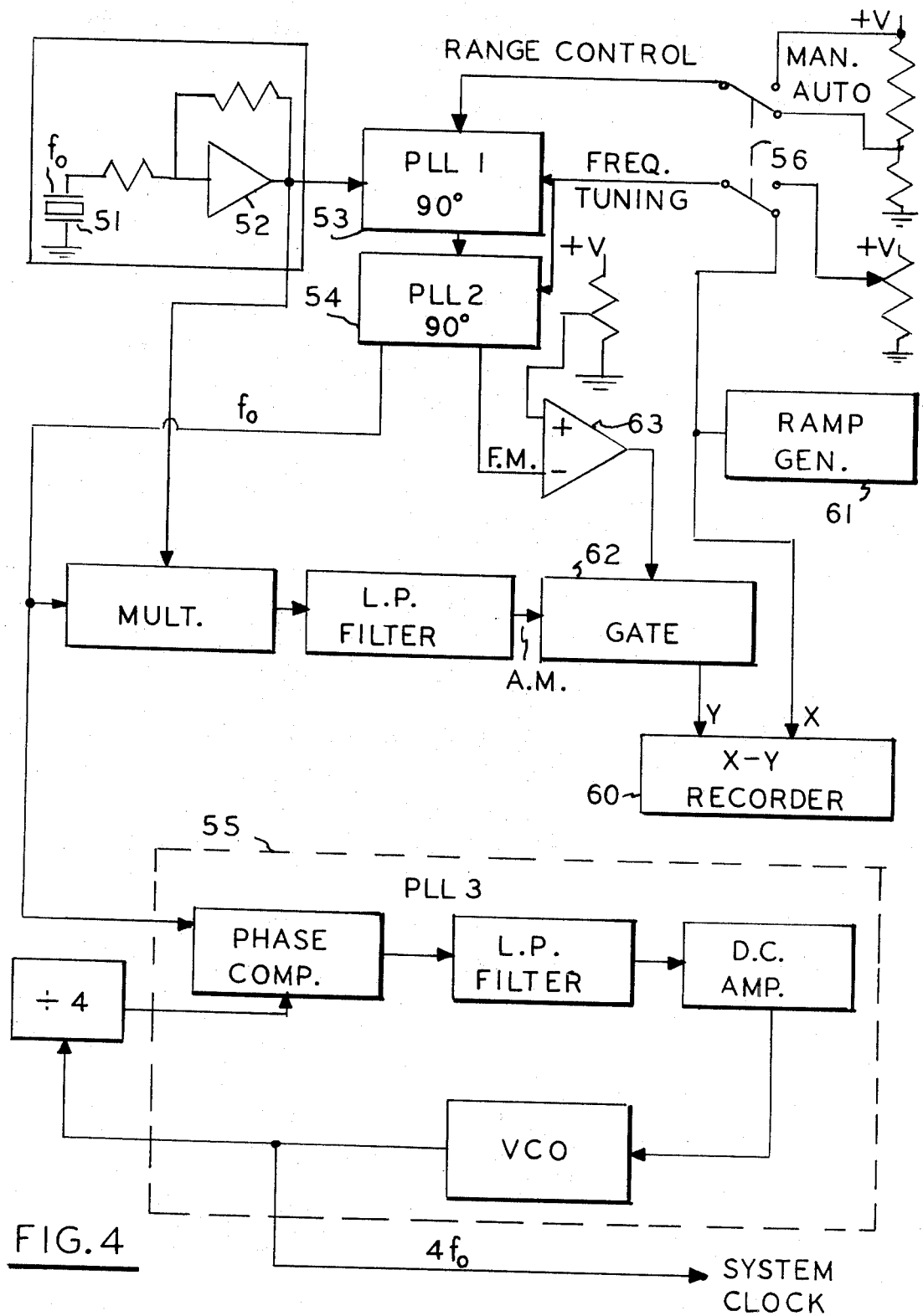

Other objects, advantages and novel features of the invention will become apparent from the following detailed description of the invention when considered in conjunction with the accompanying drawings wherein:

FIG. 1 is a block diagram of a phase-locked-loop.
FIG. 2 is a block diagram of a frequency multiplier utilizing the system.
FIG. 3 shows an amplitude modulation detector.
FIG. 4 is a detailed block diagram of one embodiment of the invention.

Referring now generally to the FIGURES, the pahse-locked-loop operates in the following manner.

A coherent signal 10 is received from a remote source and is passed into a phase comparator 11. The output 12 of comparator 11 contains an error signal that represents the phase differences between two signals; the first being one at the received frequency and the second generated by a voltage controlled oscillator 13.

Assuming initial conditions in which there is no coherent input signals, but only random noise and incoherent signals are received by phase comparator 11, the voltage controlled oscillator will operate at some random frequency. A voltage is generated thereby and is fed by input 14 to phase comparator 11 and the output signal 12 coupled to a low pass filter 15 will be fed thru a DC amplifier 17 via connection 16 and connection 18 back to the voltage controlled oscillator.

Hence the overall operation at some frequency operates the phase-lock-loop in a random manner within design characteristics.

Upon receipt of a coherent signal 19 designated as $F_o$, the phase comparator generates a voltage which is in relationship to the phase difference between the incoming signal and the voltage controlled oscillator signal. The error voltage is a signal which includes a direct current component.

$$K\cos(\phi_s - \phi_b)$$

as well as alternating current components. The low pass filter serves to remove the alternating current component and the D. C. amplifier amplifies the error signal which in turn is fed to voltage controlled oscillator 13 in a direction that tends to bring the error signal to a minimum voltage. This occurs when the phase differences between the signal $F_o$ and the output of the voltage controlled oscillator is a constant 90° at which time the voltage controlled oscillator is phase-locked; and therefore frequency locked to incoming signal $F_o$.

Low pass filter 15, which in one successful embodiment of the invention consists of a Resistance-Capacitance Network also provides a memory element for the phase-locked-loop circuit. This serves the added advantage of locking the voltage controlled oscillator to a frequency which produces an error signal upon receipt of coherent signal frequencies and when the signal frequency is lost, the voltage controlled oscillator stays at the same frequency over a period of time so that when the signal frequency returns the system is in phase.

By varying the time constant in the low pass filter in a well known manner, the period of the memory unit can be controlled. There is further provided an output from the voltage controlled oscillator 20 which can be used to read the frequency of the incoming signal for further processing use.

FIG. 2 shows a phase-locked-loop circuit being operated as a frequency multiplier having an output which is four times the incoming signal $F_o$. This circuit includes a phase-locked-loop circuit with a phase comparator 70, a low pass filter 71, a D. C. amplifier 72, and a voltage controlled oscillator 73. In addition there is provided a "divide by four" circuit 74.

Since the voltage controlled oscillator 73 has an output that is a digital signal this provides means for generating an output signal which is a multiple of the incoming signal. The output connection 75 is shown in FIG. 2 as four times $F_o$ which is derived from the digital signal. Of necessity, that signal must be divided by four in the circuit 74 to feed back a signal to the comparator 74 which is equal and in phase with incoming coherent signal $F_o$.

FIG. 3 shows a detailed block diagram of a phase-locked-loop circuit used for amplitude modulation detection wherein there is a phase comparator 30, a low pass filter 31 and a D. C. amplifier 32 coupled together and operating in a manner as described previously. This system develops a error output 33. This output is also fed to a limiter 34 whose output 35 is coupled to a voltage controlled oscillator 36 whose output is coupled back to the phase comparator 37. Additionally, there is provided a 90° phase shifter 38 coupled to receive the incoming signal via coupling 39. A multiplier 40 receives signals from phase shifter 38 and voltage controlled oscillator 36. Additionally, the low pass filter 41 takes the output of multiplier 40 and generates the amplitude modulated output 42. Finally, a tracking range control 43 is shown coupled to limiter 34 and fine tuning control 44 is shown coupled to the voltage controlled oscillator 36.

The phase-locked-loop in this case contains an error signal-limiter which limits the frequency range over which the phase-locked-loop can search for a coherent signal, as well as the range over which it can track a signal once "lock" has occurred. The external range control provides a means for opening or closing the tracking range. The search and tracking range is centered about the center frequency of the voltage controlled oscillator 36 which is set by a capacitor 45 designated as $C_o$. The center frequency of the voltage controlled oscillator can be increased or decreased by adjusting the fine tuning control 44. The combination of the tracking range and frequency controls provides a very selective amplitude modulation detector in that the tracking and lock-range can be reduced to a few cycles and the voltage controlled oscillator center can be adjusted to the frequency of interest.

Under this type of operation, the phase-locked-loop only locks and tracks signals which are within a few cycles of the voltage controlled oscillator center frequency.

For amplitude modulation detection a multiplier 40 has been included. The output of the multiplier has a direct current term $$A_s \cos(b_s - b_o)$$

as well as alternating current parts. Since the voltage controlled oscillator phase is shifted 90° from the signal on to which it is locked, the direct current term would be $$A_s \cos(90°) = 0$$

if the signal were fed directly to the multiplier. However, if the input signal is shifted by 90° before being fed to the multiplier, the multiplier output will contain the term $$A_s \cos(180° - 180°) \begin{matrix}+0°\\\end{matrix} = \pm A_s$$

The multiplier output is filtered to remove the alternating signal thereby leaving only the low frequency modulating signal. The frequency modulated output is used as the phase-locked-loop error signal and gives an indication of the frequency shift and provides a measure of the direction and amount of this shift.

If the phased-locked-loop is locked to a coherent signal, the frequency modulated output should be near zero volts. However, if no signal is present the loop will attempt to lock on the background noise resulting in an alternating current signal at the frequency modulated output. Therefore, the frequency modulated output can be monitored to determine when lock-on has been obtained.

The modifications included in this overall system which is of particular importance for this application is shown in FIG. 4. An input signal $F_o$ is received by an input circuit 49 having a transducer 51 passed thru an amplifier 52 to a first phase-locked-loop 53 which operates in the above described manner to provide lock-on and tracking of the received signal and a second phase-locked-loop 54 to provide a 90° phase shift and the amplitude modulation detector as described for FIG. 3 above.

Additionally, $F_o$ is coupled to a third pahse-locked-loop 55 to provide a frequency multiplication for the purpose of providing a system clock for the holographic imaging system. Provision is made thru switch 56 to provide either manual or automatic made of operation. During the automatic mode the range over which the phase-locked-loop can lock-on is restricted to only a few cycles and the operating frequency is swept over the entire frequency range of interest.

The second phase-locked-loop tracks the first phase-locked-loop and performs amplitude modulation detection on signals centered at the voltage controlled oscillator frequency. Thus, the combination of the phase-locked-loop of the first and second phase-locked-loop forms a very narrow band amplitude modulation detector and will analyze the spectrum of the incoming signal. Additionally, there is provided an X-Y recorder 60 and a gate circuit 62.

The amplitude modulated output is gated by the frequency modulation outputs thru gate 62 to the X-Y recorder. Ramp generator 61 output is also fed to the X-Y recorder 60 and will give a permanent record of the received signal spectrum. The frequencies of interest will be selected from this recording and the system will then be switched to the manual mode and manually adjusted to these frequencies for imaging purposes. In this mode of operation, the tracking range of the pahse-locked-loop will be opened to ensure tracking of the signal after lock-on. An acceptance level detector 63 may be included to lock out the audio modulation output until the system has locked on a valid signal.

The third phase-locked-loop 55 operates in the described manner as the other phased-locked-loop and produces a signal which is equivalent to four times the frequency of the received signal and used in the holographic system for clock purposes.

Obviously many modifications and variations of the present invention are possible in the light of the above teachings. It is therefore to be understood that within the scope of the appended claims the invention may be practiced otherwise than as specifically described.

We claim:
1. A passive Holography system comprising;
 a. an input circuit for receiving coherent remotely generated acoustical signals and generating output signals therefrom;
 b. a first phase-locked-loop circuit coupled to receive said output signals from said input circuit;
 c. a second phase-locked-loop circuit coupled to the signal from the said first phase-locked-loop to provide a 90° phase shift;
 d. a multiplier circuit coupled to the output of said second phase-locked-loop circuit and to said input circuit to provide an amplitude modulated signal that represents the received signal at the frequency set by said first phase-locked-loop;
 e. a first low pass filter coupled to receive the output of said multiplier circuit to filter out noise components;
 f. a third phase-locked-loop circuit coupled to receive a signal from said second phase-lokced-loop circuit for generating an output signal that is a frequency multiple of said acoustical signal;
 g. a switching system having manual and automatic positions for providing two modes of operation for said system coupled to said first and said second phase-locked-loop circuits;
 h. an X-Y recorder coupled to said switching circuit;
 i. a gate circuit coupled to said X-Y recorder, said gate circuit coupled to receive said amplitude modulated output signal from said multiplier circuit; and,
 j. means for coupling the output of said first phase-locked-loop to said gate circuit.

2. The improved passive holography system of claim 1 wherein said first phase-locked-loop circuit includes an input phase comparator circuit, a low pass filter, a direct current amplifier, a voltage controlled oscillator in which said phase comparator receives a signal from said input circuit and couples it thru said second low pass filter to said direct current amplifier that develops an error signal which is utilized to drive the voltage controlled oscillator to change the frequency output of said voltage controlled oscillator in a direction to bring the oscillator to the same frequency as the signal from the input system, said output of said oscillator is coupled to said phase comparator.

3. The system of claim 2 wherein said second phase-locked-loop circuit has substantially the same configuration as said first phase-locked-loop circuit.

4. The system of claim 3 wherein there is provided a third phase-locked-loop circuit coupled to receive the output signal of said second phase-locked-loop circuit that is a multiplier of said output signal to provide a system clock circuit for the acoustic holography system.

5. The system of claim 4 wherein said third phase-locked-loop circuit has substantially the same configuration as the first phase-locked-loop circuit.

6. The system of claim 3 wherein said second low pass filter has selected components which provide a memory signal such that loss of incoming signals to the input circuit for brief periods of time does not cause the voltage controlled oscillator to deviate from its then operating signal.

* * * * *